United States Patent Office 3,264,250
Patented August 2, 1966

3,264,250
COPOLYMERIC POLYAMIDE-ACIDS AND POLYIMIDES
Walter G. Gall, Wilmington, Del., assignor to E. I. du Pont de Nemours and Company, Wilmington, Del., a corporation of Delaware
No Drawing. Filed Dec. 18, 1963, Ser. No. 331,353
6 Claims. (Cl. 260—32.6)

This invention relates to two novel copolymers.

One of the novel copolymers, the final copolymer, is characterized by extremely high thermal, chemical and hydrolytic stabilities and in film or filament form is characterized by excellent tensile properties. This copolymer is also characterized by the fact that as a self-supporting film, it displays excellent heat-sealability. This combination of properties serves to make this copolymer an excellent prospect for use as a packaging film. This combination of properties serves also to make this copolymer relatively easy to mold (more accurately, coalesce, since the copolyimide does not have a crystalline melting point) into articles that are useful under rugged conditions. This final copolymer comprises at least 30 mole percent, preferably at least 40 mole percent, of recurring units of (A)

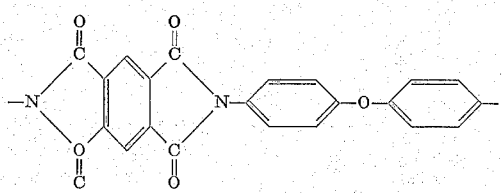

and at least 20 mole percent of recurring units of (B)

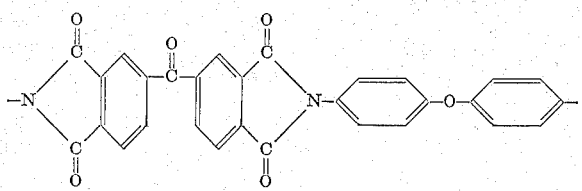

The second of the novel copolymers is the intermediate copolymer. Solutions of this copolymer are characterized by short gelation times after certain dehydrating agents have been added. Such solutions, containing anywhere from 10% to 40% of this copolymer in a solvent, will be shapeable and gel (suddenly increase in viscosity) within about ten minutes after adding the dehydrating agent. This intermediate copolymer comprises at least 30 mole percent, preferably at least 40 mole percent, of recurring units of (C) [1]

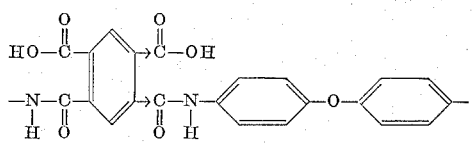

and at least 20 mole percent of recurring units of (D) [2]

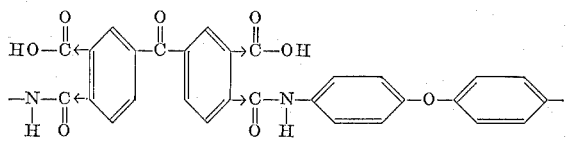

It should be understood that some recurring units of (A) and (B) may also be present in the intermediate copolymer. That is, some conversion may take place without necessarily destroying the shapeability of the intermediate copolymer.

A preferred process for preparing self-supporting films is the subject of copending U.S. application Serial No. 331,367 filed December 18, 1963, by William Robert Hendrix and assigned to the assignee of the present application. It involves the steps, in sequence, of reacting 4,4′-diaminodiphenyl ether [3] with a mixture of pyromellitic dianhydride and 3,3′,4,4′-benzophenone tetracarboxylic dianhydride in an inert organic solvent for a time and at a temperature sufficient to form a solution in the solvent of a polyamide-acid, the intermediate copolymer, having at least 30 mole percent of the (C) recurring units and at least 20 mole percent of the (D) recurring units; adding to the polyamide-acid solution a lower fatty acid anhydride capable of converting the polyamide-acid in the solution to the corresponding polyimide at a temperature of $T_1$ and maintaining the temperature of the solution below $T_1$ to prevent any substantial conversion to the polyimide; forming the solution into a self-supporting film; and, thereafter, raising the temperature of the film to at least $T_1$ to convert the polyamide-acid in the film to a copolymer having at least 30 mole percent of the (A) recurring units and at least 20 mole percent of the (B) recurring units. The recurring units in both the intermediate and the final copolymers may be arranged randomly or in blocks, as is known to those skilled in the art. The number of recurring units should be sufficient to provide a film-forming polymer, i.e., an inherent viscosity in a suitable solvent when measured at 30° C. of at least 0.5, preferably at least 1.3.

It should be understood that any of the processes for forming polyamide-acids and for converting these polymers into polyimides, either before molding them in the form of powders into useful articles or after shaping them into films, filaments, tubes, etc., may be used. Thus, any of the processes disclosed in copending U.S. applications Serial No. 95,014, filed March 13, 1961 (now U.S. Patent No. 3,179,614) and Serial Nos. 169,106; 169,107; 169,108 and 169,120 filed January 26, 1962, (now U.S. Patents Nos. 3,179,630, 3,179,631, 3,179,632, and 3,179,634, respectively) may be used to form the novel copolymers of the present invention. The final copolyimides may also be formed by proceeding through intermediates other than polyamide-acids, e.g., polyamide-esters, polyamide-amides, polytetrazole acids, polyiminolactones, etc.

It should also be understood that although the reactants are a diamine and two dianhydrides, these materials need not be used initially. These reactants may be formed in situ. Thus, instead of using the dianhydride as such, one or both of the tetracarboxylic acids may be used along with such high-boiling solvents as diphenyl ether. By applying heat, the dianhydride is formed.

The solvents useful in the solution polymerization process for synthesizing the polyamide-acid composition are the organic solvents whose functional groups do not react with any of the reactants to any appreciable extent. Besides being inert to the system, and preferably, being a solvent for the polyamide-acid, the organic solvent must be a solvent for at least one of the reactants, preferably for all of the reactants. To state it another way, the organic solvent is an organic liquid other than any of the reactants or homologs of the reactants that is a solvent for at least one reactant, and contains functional groups, the functional groups being groups other than monofunctional primary and secondary amino groups and other than the monofunctional dicarboxylanhydro groups. The normally liquid organic solvents of the N,N-dialkylcar- ---
[1] The arrows denote isomerism, i.e., the groups to which the pair of arrows from each ring point may exist as shown or in interchanged position.
[2] The arrows denote isomerism, i.e., the groups to which the pair of arrows from each ring point may exist as shown or in interchanged position.
[3] Also called bis(4-aminophenyl)ether.

boxylamide class are useful as solvents in the process. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used are: dimethylsulfoxide, N-methyl-2-pyrrolidone, tetaramethyl urea, pyridine, dimethylsulfone, hexamethylphosphoramide, teramethylene sulfone, formamide, N-methylformamide and butyrolactone. The solvents can be used alone, in combinations of solvents, or in combination with poor solvents such as benzene, benzonitrile, dioxane, xylene, toluene and cyclohexane.

It should be understood that it is not necessary that the polymeric components of the composition to be formed into a shaped article be composed entirely of the polyamide-acid. This is particularly true since conversion to the polyimide is contemplated subsequently.

Furthermore, in determining a specific time and a specific temperature for forming the polyamide-acid, several factors must be considered. The maximum permissible temperature will depend upon the amounts of the dianhydrides used, the particular solvent, the percentage of polyamide-acid desired in the polyamide-acid composition and the minimum period of time that is desired for the reaction. For most conditions, it is possible to form compositions of 100% polyamide-acid by conducting the reaction below 100° C. However, temperatures up to 175° C. may be tolerated to provide shapeable compositions. The particular temperature below 175° C. that must not be exceeded for any particular set of conditions of the amounts of dianhydrides, solvent and reaction time to provide a reaction product having the desired minimum inherent viscosity will vary but can be determined by a simple test by any person of ordinary skill in the art.

The degree of polymerization of polyamide-acid is subject to deliberate control. The use of a molar amount of diamine that is equal to the total molar amount of both anhydrides under the prescribed conditions will provide polyamide-acids of very high molecular weight. The use of diamine or dianhydride in large excess limits the extent of polymerization. In the preparation of the polyamide-acid, it is essential that the molecular weight be such that the inherent viscosity of this intermediate copolymer is at least 0.5, preferably 1.3–5.0. The inherent viscosity is measured at 30° C. at a concentration of 0.5% by weight of the copolymer in a suitable solvent, e.g., N,N-dimethylacetamide. To calculate inherent viscosity, the viscosity of the copolymer solution is measured relative to that of the solvent alone.

$$\text{Inherent viscosity} = \frac{\text{natural logarithm} \frac{\text{Viscosity of solution}}{\text{Viscosity of solvent}}}{C}$$

where C is the concentration expressed in grams of copolymer per 100 milliliters of solution.

The quantity of organic solvent used in the process need only be sufficient to dissolve enough of the diamine to initiate the reaction of the diamine and the dianhydrides. It has been found that the most successful results are obtained when the solvent represents at least 60% of the final solution. That is, the solution should contain 0.05–40% of the copolymer.

In the preferred process, the next step after forming the copolyamide-acid solution involves adding the dehydrating or cyclizing agent to the solution while maintaining the solution under conditions that prevent any substantial conversion of the polyamide-acid to polyimide.

Operable dehydrating agents are the lower fatty monobasic acid anhydrides of U.S. patent application Serial No. 169,106 (now U.S. Patent No. 3,179,630). The list includes acetic anhydride, propionic anhydride, butyric anhydride, valeric anhydride, mixed formic-acetic anhydride, ketone, dimethyl ketone, etc.

Although the stoichiometric equivalent, based on the polyamide-acid, of the dehydrating agent alone is operable, it is preferred to use 1.5–3 times the stoichiometric amount of the dehydrating agent and to have some of a tertiary amine, preferably pyridine, 3-methyl pyridine or isoquinoline, present as well. The ratio of the tertiary amine to anhydride may vary from zero to almost infinite mixtures with a 0.05–1:1 ratio being the most common range used with tertiary amines having the activity of pyridine, 3-methyl pyridine and isoquinoline.

Tertiary amines having approximately the same activity as the preferred pyridine, 3-methyl pyridine and isoquinoline may be used in the process. These include 3,4-lutidine, 3,5-lutidine, 4-methyl pyridine, 4-isopropyl pyridine, N,N-dimethyl benzyl amine, 4-benzyl pyridine, and N,N-dimethyl dodecyl amine. As mentioned previously, these amines are generally used from 0.05 to equimolar amounts with that of the anhydride converting agent. Trimethyl amine and triethylene diamine are much more reactive, tnd therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, N,N-diethyl cyclohexylamine, N,N-dimethyl cyclohexylamine, 4-benzoyl pyridine, 2,4-lutidine, 2,6-lutidine and 2,4,6-collidine, and are generally used in larger amounts.

During the step in which the dehydrating agent is added, it is necessary to maintain the temperature below that which would cause substantial conversion of the polyamide-acid to polyimide. The particular temperature maintained during this step will depend upon the solvent used, the reactivity of the particular dehydrating agent used and the concentrations of the dehydrating agent and the tertiary amine. Generally, the polyamide-acid solution containing the dehydrating agent is maintained at a temperature of about −5° C. to about room temperature (25° C.). It has been found that as long as the temperature is maintained below 25° C. or thereabouts, the system remains "essentially inactive." By "essentially inactive" it is meant that no more than 10% of the polyamide-acid is converted to the polyimide in ten minutes at this temperature. It should be understood that occasionally more conversion can be tolerated. The particular amount will depend upon the particular intermediate copolymer, the nature and the amount of solvent, and the method contemplated for shaping the composition of the intermediate copolymer into a useful article.

Shaping can be performed in a wide variety of procedures. The polyamide-acid solution can be extruded, spun, sprayed, blade-coated or molded. Films of the solution can be conveniently formed by extruding the solution through an orifice onto a belt, drum or similar smooth surface. Foams can be made by the techniques disclosed in U.S. patent applications Serial Nos. 266,065 and 266,066 filed March 18, 1963, and assigned to the assignee of the present application. The polyamide-acid solution may also be sprayed onto a surface to provide a coating. Spraying is particularly useful for coating irregularly shaped articles and rough surfaces and for impregnating porous materials.

In the next step of the preferred process, the temperature of the shaped article is raised in order to convert the intermediate copolymer in the article to the final copolymer, the copolyimide. The temperature at which the system can be thus activated depends primarily upon the activity and the amount of the dehydrating agent present. Usually, the temperature is elevated to one in the range of 40–110° C. The use of such temperatures will convert the intermediate copolymer to the copolyimide within 10 to 200 seconds. The final copolymer, the copolyimide should have an inherent viscosity that corresponds substantially to the inherent viscosity of the intermediate copolymer, i.e., at least .5 and preferably at least 1.3. However, because of the chemical stability of the copolyimide, a suitable solvent for measuring the inherent viscosity may have to be concentrated sulfuric acid.

By the use of the present invention, it is possible to provide a copolyimide having excellent tensile properties and the like. The intermediate copolymer, the polyamide-acid displays excellent gelation properties so that the composition of the intermediate copolymer can be shaped within about 10 minutes. In order to determine the precise gelation time for a particular polyamide-acid solution under a particular set of conditions, the following method is suggested:

Weigh out sufficient polyamide-acid solution to provide 0.01 mole (based on repeat unit weight) of polymer solids. Contamination and atmospheric moisture should be avoided. Next, add 0.04 mole of acetic anhydride. Mix thoroughly and adjust to the desired gelation temperature, generally room temperature.

Finally, add 0.005 mole of the tertiary amine catalyst (pyridine or the like) and mix thoroughly. The period from the addition of catalyst and the observation in the sudden increase in viscosity is the "gelation time."

The intermediate copolymer can be used as a self-curing adhesive, either as a self-supporting film or as a coating layer on another material with or without the conventional adhesive additives, e.g., anti-oxidants, cross-linking agents, etc. In either case, thermal curing produces a copolyimide layer. These simple operations can be used in coating various substrates uniformly even though they may be porous and/or have irregular surfaces. Materials which can be bonded to themselves or other materials include aluminum foil, steel sheeting, glass, asbestos, and various fabrics and films made of materials such as glass, polyamides and polyimides which are thermally stable enough to withstand the temperatures required for the curing of the adhesive layer. Instead of using a copolyamide-acid solution as a coating on one or both pieces to be adhered together, or of using the copolymer in film form as an intermediate adhesive layer, one can use an adhesive sheet made by impregnating a thermally stable paper or fabric with a fluid copolyamide-acid composition, e.g., an adhesive tape.

The final copolyimide in the form of a shaped article such as a self-supporting film exhibits, besides excellent tensile properties and high thermal and chemical stabilities, heat-sealability. In view of the high thermal stability of the product, this property (heat-sealability) comes as a welcome surprise. In the form of a powder, this thermally stable copolyimide displays unexpectedly good flow properties for molding purposes.

A particularly useful adhesive film takes advantage of the interesting combination of copolyimide properties. It is composed of a polyimide film or other thermally stable substrate coated on one or both sides with a layer of the copolyimide. It can be formed by coating the substrate with the copolyamide-acid which is then cured to form the copolyimide. These coated substrates can then be laminated together under moderate conditions, i.e., by applying a pressure of 200 p.s.i. at 315° C. for about one hour. It has been found that a coated film of the pyromellitimide of bis(4-aminophenyl) ether can be bonded to aluminum so tightly that the film tears before the bond peels.

The invention will be more clearly understood by referring to the examples which follow. These examples, which illustrate specific embodiments of the present invention, should not be construed to limit the invention in any way.

Example 1

An equimolar copolyimide, i.e., 50% recurring units of previously defined (A) and 50% recurring units of previously defined (B), is prepared by mixing 5.45 grams (0.025 mole) of pyromellitic dianhydride with 8.00 grams (0.025 mole) of 3,3',4,4'-benzophenone tetracarboxylic dianhydride, and adding the mixture to 10 grams (0.05 mole) of bis(4-aminophenyl) ether in 133 grams of N,N-dimethylacetamide. By maintaining the temperature at about room temperature, a 15% by weight solids solution containing 15% by weight of the corresponding copolyamide-acid results. The inherent viscosity of this copolymer, as measured at 30° C. in N,N-dimethylacetamide, is above 0.5. Its gel time is 7 minutes at room temperature.

To a 15 gram sample of this polymer solution (0.005 mole of the copolymer) is added 1.66 grams of (0.0162 mole) of acetic anhydride. After thorough mixing, 0.28 gram (0.00215 mole) of isoquinoline is mixed thoroughly into the solution. The solution is then cast with a doctor knife onto a cold (25° C.) glass plate. The plate is then heated by steam at 100–110° C. for 3 minutes. The plate is removed from the steam bath and allowed to cool to room temperature. The film is stripped from the glass plate; clamped onto a frame; and converted completely to the dry copolyimide by heating 30 minutes in a 300° C. oven. The inherent viscosity of the copolyimide, as measured at 30° C. in N,N-dimethylacetamide, is above 0.5. The copolyimide film is strong, stable and is heat-sealable to itself.

In contrast, a polyamide-acid solution prepared from 3,3',4,4'-benzophenone tetracarboxylic dianhydride and bis(4-aminophenyl) ether is difficult to process by the procedure described. The gel time at room temperature is 12 minutes. The gel film tends to become thin upon heating and, as a film, seems to be too weak to be dried under restraint and converted to a useful polyimide film. While the corresponding polyamide-acid solution prepared from pyromellitic dianhydride and bis(4-aminophenyl) ether performs satisfactorily in the above process (the gel time is less than 10 minutes), the resulting polyimide film is not heat-sealable.

Examples 2 and 3

Samples of 7:3 and 3:7 molar ratio pyromellitic/benzophenone tetracarboxylic copolyimides are prepared by adding one mixture of 7.63 grams of pyromellitic dianhydride and 4.83 grams of the 3,3',4,4'-benzophenone tetracarboxylic dianhydride and another mixture of 3.27 grams pyromellitic dianhydride and 11.27 grams of the 3,3',4,4'-benzophenone tetracarboxylic dianhydride to each of two 10 gram portions of bis(4-aminophenyl) ether dissolved in about 130 grams of N,N-dimethylacetamide. The resulting copolyamide-acids have inherent viscosities, as measured in N,N-dimethylacetamide, of 1.9 and 1.5, respectively. Their gel times, as measured by the pyridine procedure described previously, are 6.8 and 9.3 minutes, respectively. Both copolyamide-acid solutions are converted by heating at 300° C. to copolyimide films having good physical properties and which are heat-sealable.

Example 4

A mixture of 8.96 grams (0.025 mole) of 3,3',4,4'-benzophenone tetracarboxylic acid, 6.4 grams (0.025 mole) of pyromellitic acid and 60 ml. of alkali-washed diphenyl ether is heated to 250° C. and held there for about 10 minutes until the solids are in solution. The mixture is cooled to 225° C. and 60 ml. of N,N-dimethylacetamide is added. A solution of 10.01 grams (0.05 mole) of bis(4-aminophenyl) ether in 60 ml. in N,N-dimethylacetamide is added at 175° C. The resulting copolyamide-acid has an inherent viscosity of 0.6.

A solution of 7.6 grams of triethylamine in 10 ml. of N,N-dimethylacetamide is added to the copolyamide-acid solution at 150° C. The mixture is maintained to 150–155° C. for 20 minutes. The product is separated by filtration, washed with acetone and dried under vacuum at 60° C. overnight to yield 22.3 grams of the polymeric powder. The powder is heated at 325° C. under nitrogen for 8 hours to yield 18.8 grams of the copolyimide powder.

A chip is molded or coalesced from the copolyimide powder using a method similar to that described in co-pending U.S. application Serial No. 169,107 (now U.S. Patent No. 3,179,631). A pressure of 6000 p.s.i. is applied for 20 minutes while the mold case is heated to 400° C. After cooling to 300° C., the chip is removed from the mold case. It is extremely tough and examination reveals very good flow properties. Its tensile impact strength is 176 foot-pounds/cubic inch and its tensile strength is approximately 20,000 p.s.i.

What is claimed is:

1. A copolymer consisting essentially of at least 30 mole percent recurring units of

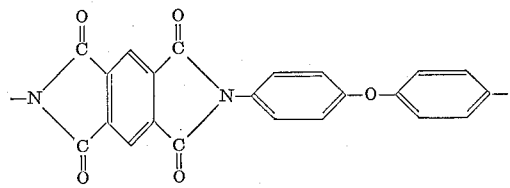

and at least 20 mole percent recuring units of

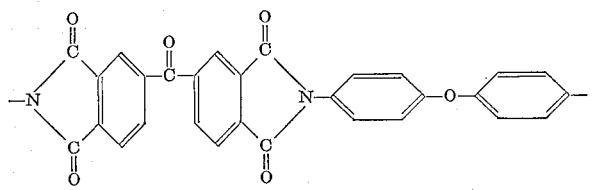

said copolymer having an inherent viscosity of at least 0.5 when measured at 30° C. as an 0.5% by weight solution in concentrated sulfuric acid.

2. A self-supporting film consisting essentially of a copolymer consisting of at least 30 mole percent recurring units of

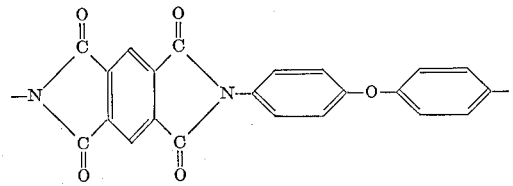

and at least 20 mole percent recurring units of

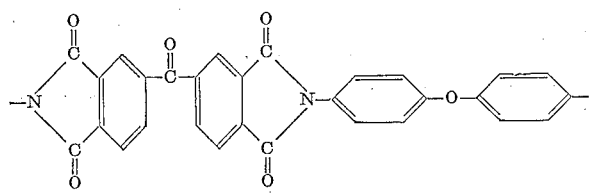

said copolymer having an inherent viscosity of at least 0.5 when measured at 30° C. as an 0.5% by weight solution in concentrated sulfuric acid.

3. A moldable powder consisting essentially of a copolymer consisting essentially of at least 30 mole percent recurring units of

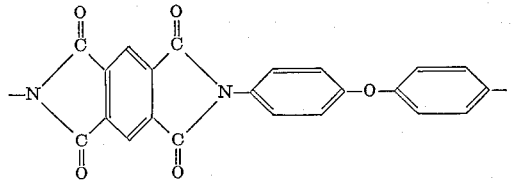

and at least 20 mole percent recurring units of

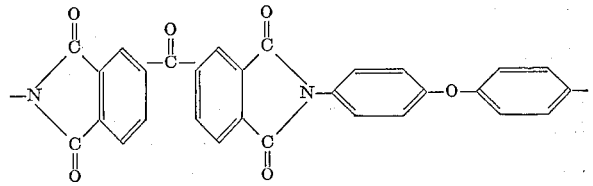

said copolymer having an inherent viscosity of at least 0.5 when measured at 30° C. as an 0.5% by weight solution in concentrated sulfuric acid.

4. A copolymer consisting essentially of at least 30 mole percent recurring units of

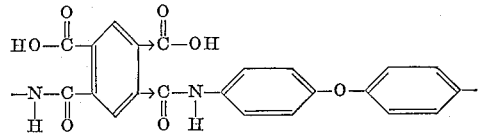

and at least 20 mole percent recurring units of

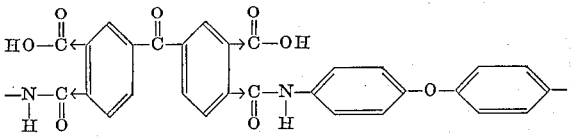

said copolymer having an inherent viscosity of at least 0.5 when measured at 30° C. as an 0.5% by weight solution in N,N-dimethylacetamide.

5. A shapeable composition comprising a copolymer consisting essentially of at least 30 mole percent recurring units of

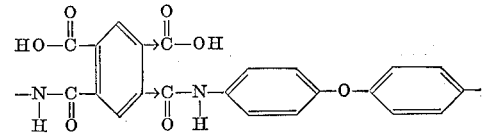

and at least 20 mole percent recurring units of

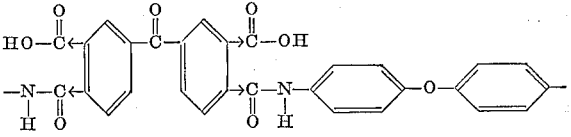

in a solvent, said copolymer having an inherent viscosity of at least 0.5 when measured at 30° C. as an 0.5% by weight solution in N,N-dimethylacetamide.

6. A shapeable composition as in claim 5 wherein the solvent is N,N-dimethylacetamide.

References Cited by the Examiner

UNITED STATES PATENTS 3,179,614    4/1965    Edwards.
3,179,631    4/1965    Endrey.
3,179,635    4/1965    Frost et al.

ALLAN LIEBERMAN, *Acting Primary Examiner.*

L. T. JACOB, *Assistant Examiner.*